United States Patent [19]

Hacker et al.

[11] 4,322,900
[45] Apr. 6, 1982

[54] IRONING DEVICE FOR INDUSTRIAL USE AND ASSOCIATED IRON

[76] Inventors: Kurt Hacker, Birkenwaldstrasse 155, 7000 Stuttgart; Jiri Dokoupil, Hochstrasse 9, 6251 Gückingen, both of Fed. Rep. of Germany

[21] Appl. No.: 2,314

[22] Filed: Jan. 10, 1979

[30] Foreign Application Priority Data

Jan. 11, 1978 [DE] Fed. Rep. of Germany ....... 2801012
May 26, 1978 [DE] Fed. Rep. of Germany ....... 2822930
May 26, 1978 [DE] Fed. Rep. of Germany ....... 2822930

[51] Int. Cl.³ .............................................. D06F 75/02
[52] U.S. Cl. .................................... 38/77.6; 38/77.7; 38/82; 219/252
[58] Field of Search ................... 38/74, 75, 77.1, 77.3, 38/77.5, 77.6, 77.7, 81, 82, 84, 85, 94; 219/250, 251, 252, 272

[56] References Cited

U.S. PATENT DOCUMENTS

| | | | |
|---|---|---|---|
| 2,402,575 | 6/1946 | Purpura | 38/82 X |
| 2,609,625 | 9/1952 | Bate | 38/77.7 X |
| 2,673,917 | 3/1954 | Woodling | 38/82 |
| 2,833,903 | 5/1958 | Waddell | 219/251 X |
| 2,851,050 | 9/1958 | Cissell et al. | 38/77.6 X |
| 2,871,587 | 2/1959 | Jepson | 219/251 X |
| 2,881,300 | 4/1959 | Schwaneke | 38/82 |
| 3,114,819 | 12/1963 | Woodling | 219/252 X |
| 3,170,257 | 2/1965 | Dziadulonis et al. | 38/77.6 |
| 3,424,894 | 1/1969 | Schwartz et al. | 219/252 X |
| 4,130,955 | 12/1978 | Baumgartner et al. | 38/82 |

FOREIGN PATENT DOCUMENTS 1351595 5/1974 United Kingdom .

*Primary Examiner*—Louis Rimrodt
*Attorney, Agent, or Firm*—Yount & Tarolli

[57] ABSTRACT

The disclosure relates to an ironing device comprising an iron having an electrically heated and temperature regulated sole, at least one temperature sensor positioned in the vicinity of said sole, and a heater connected to an external electric supply. A temperature regulator is positioned remote from the iron for controlling the current supply to the heater and is responsive to the temperature sensor. The temperature sensor has at least one temperature-dependent resistor and at least one compensating resistor connected with the temperature-dependent resistor. An actual-valve input sets the desired temperature of the sole. The temperature-dependent resistor is also connected to the actual-value input. The overall value of resistance formed by the temperature-dependent resistor and the compensating resistor at a predetermined sole temperature is selected to correspond with the overall resistance of the actual-value input when the resistance of the variable resistance component has been selected to correspond to the predetermined temperature.

24 Claims, 7 Drawing Figures

IRONING DEVICE FOR INDUSTRIAL USE AND ASSOCIATED IRON

BACKGROUND OF THE INVENTION

The invention relates to an ironing device for industrial use, having an iron which has an electrically heated and temperature-regulated sole as well as at least one temperature sensor arranged on or adjacent to the sole and a heater connected by a flexible lead to a source of heating current.

In known irons regulation of the heating of the sole of the iron is effected by means of a thermostat or thermostats which are accommodated in the iron itself, fastened to the sole. For industrial use this is unsatisfactory, inter alia because of the thermal hysteresis of the usual bimetallic thermostats, because of the relatively high power which has to be switched directly by the contacts of the thermostat, and above all because of the high frequency of switching and the working life demanded.

SUMMARY OF THE INVENTION

According to the invention an ironing device compises an iron having an electrically heated and temperature-regulated sole, at least one temperature sensor positioned on or adjacent to the sole and a heater connected by a flexible cable to an external source of electrical current for heating. The temperature sensor is connected by a flexible cable to a temperature regulating device positioned remote from the iron to control the current through the flexible cable supplying current to the heater. Thus, the temperature sensor and regulating device are separated from one another in space. Consequently the regulating device and the heating power switch associated with it are no longer subject to the confined conditions in the iron. Because of the elimination of the effect of heat on the regulating device, electronic elements and circuits may now be employed in the regulating device without problems.

As a result of the employment of an electrical temperature sensor and an electronic regulating device, the need arises for a relatively accurate alignment of the desired temperatures to be set in respect to the characteristic of the temperature sensor or of its temperature-dependent element. This is preferably a temperature-dependent resistor, in particular one having a negative temperature coefficient of its value of resistance (NTC-resistor). Further, the present invention contemplates a temperature sensor which has at least one temperature-dependent resistor connected with at least one compensating resistor and also connected to the actual-value or desired value input of the temperature regulating device. The actual value input is an adjustable circuit which provides a set point or desired value for the iron sole plate temperature. The overall value of the resistance formed by the temperature-dependent resistor and the compensating resistor at a predetermined temperature is set to correspond with the actual-value input-resistance associated with this temperature in the temperature regulating device. Accordingly, for at least one sensor temperature or for one point on the temperature-resistance curve the overall value of resistance of the sensor element and compensating resistor may be accurately aligned with the associated actual-value of input resistance of the temperature regulating device.

Preferably, a pair of compensating resistors are provided, one in parallel and one in series with the temperature dependent resistor. In this way two pairs of values of sensor temperature and actual-value input resistance can be aligned.

A further need is the interchangeability between a plurality of irons and a plurality of associated temperature regulating devices. To accomplish this it is necessary that the resistance of each temperature sensor have the same dependence on temperature. To this end the temperature sensors are aligned by means of compensating resistors whose values are determined at predetermined sensor temperatures.

Furthermore, if inexpensive components and circuit modules are to be employed for the regulating device, considerable tolerances have to be taken into consideration. In the actual value input circuit there is at least one adjusting resistor whose value is selected so that the total resistance of the actual value input circuit matches the resistance of the temperature sensor at the predetermined sensor temperatures. In this way alignment on the regulator side is provided to promote interchangeability. Thus, according to the present invention there is provided a temperature regulator which has an input circuit having a first input sub-circuit and a second input sub-circuit, the first input sub-circuit having a setting-resistor for setting the desired temperature of the iron, a parallel-connected first adjusting-resistor and/or a second adjusting-resistor connected in series with the setting-resistor. The second input sub-circuit includes therein the temperature-dependent resistor of the temperature sensor. Preferably the temperature sensor of the iron is connected to the temperature regulating device by a lead having at least one plug-in connector, at least one compensating resistor is positioned on the side of the connector adjacent the iron and at least one adjusting-resistor being positioned on the side of the plug-in connector adjacent the temperature regulating device.

Irons for industrial use are frequently made as steam irons of the kind mentioned above. Usually problems are posed by regards the manual control of the steam feed because of unwieldly and inertia-ridden control valve arrangements. Further, there is the problem of creating a steam iron having a control valve arrangement which can be handled with little fatigue and which is suitable for accurate proportioning of steam in ironing service. A solution of this problem is the provision of a manually actuable switch for the control of the steam feed, the control-switch controlling power to a solenoid valve arranged in the steam feed. A handle extends generally parallel with the face of the sole of the iron, and the control-switch has an actuator mounted on the handle. The direction of motion of the actuator intersects the handle substantially at right angles to the longitudinal axis of the handle. Such a construction enables easy pulse-like actuation of the control switch at relatively high frequency of repetition by the thumb of the hand holding the handle of the iron, without the grip and hence the secure guidance of the iron needing to be loosened. In a preferred embodiment the direction of motion of the control switch actuator member is adapted to an optimum to the anatomical proportions of the hand.

Industrial irons, in particular steam irons of the kind described hitherto, are subject to heavy loadings on the face of the sole because of friction and wear as well as the action of corrosive vapours at fairly high temperatures. Wear also depends upon the surface condition and composition of the textiles to be processed. To this end it is preferred that the sole of the iron has a layer having a microporous structure, a layer of hard aluminum oxide being provided embracing the edges of the sole, and the face of the sole being formed by a surface layer of a slide-promoting plastic which likewise embraces the edges of the sole. The hard, preferably "Eloxal", layer brings about protection against damage of the edges of the sole which are sensitive to impact. The microporous layer in the region of the face of the sole produces secure anchoring of the surface layer of the face of the sole, and the surface layer consists of a slide-promoting plastic, in particular polytetrafluorethylene. The cladding of the edges of the sole with the slide-promoting plastic layer has the advantage that the iron slides easily on all fabric structures. If after partial wear of the plastic surface layer, the prominent parts of the microporous layer come to light, the comparatively high slide-promoting characteristic and softness of the molybdenum has a favourable effect for the maintenance of satisfactory sliding ability.

BRIEF DESCRIPTION OF THE DRAWINGS

The invention will now be described with reference to the accompanying drawings, in which.

DESCRIPTION OF A PREFERRED EMBODIMENT

Figure 1:
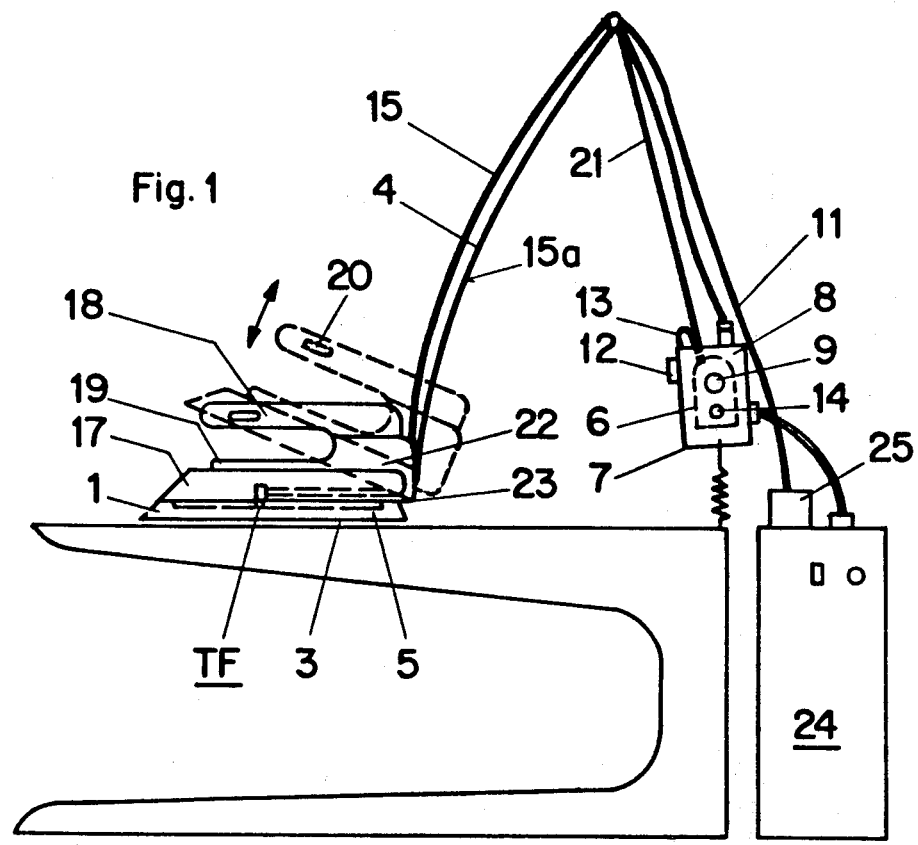
FIG. 1 shows an ironing device having an electrically heated steam iron and a separate temperature regulating device as well as a steam generator, in diagrammatic side elevation.
Figure 2:
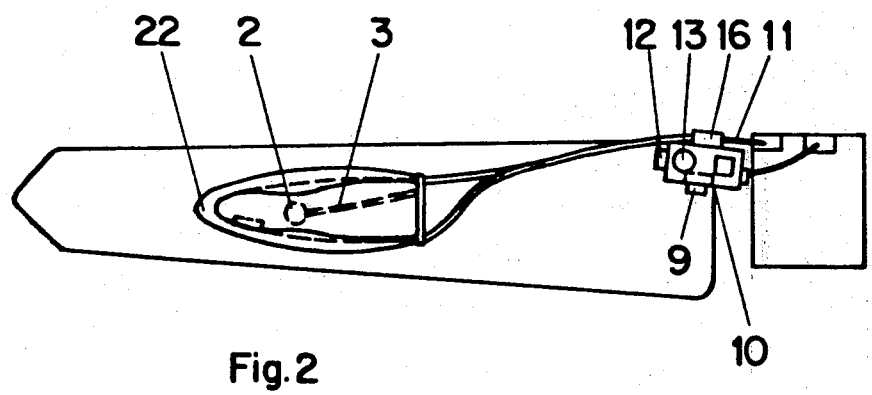
FIG. 2 is a plan view of the ironing device of FIG. 1.

The ironing device as in FIG. 1 comprises a steam iron 22 which is connected via a flexible strand of supply leads comprising a multicore electrical cable 15 as well as a steam lead 15a to a temperature regulating device 6 and to a steam generator 24 respectively with an electromagnetic control valve 25 for manual control of the steam feed. From a microswitch 20 lying in the handle 18 of the iron, via a control lead contained in the cable 15, this valve is opened pulsewise in two-position operation or respectively closed in the intervals of disconnection. The cable 15 further contains a lead 3 for the connection of a temperature sensor fitted to the sole 1 of the iron, to the actual value signal input of the regulating device 6 as well as a lead 4 for the connection of the heater 5 of the iron via the correcting element of the regulating device 6, for example, an a.c. switch for the heating power, to the source of heating current. The cable 15 and the steam lead 15a are fitted by an adjustable mechanical fastening 16 to a whip-like flexible cable mounting 21. The regulating device 6 with its control elements, that is, a desired temperature setting member 10, for example, a potentiometer, with a knob 9 and a switch 12 for switching the iron on and off, as well as with its pilot and indicating elements, that is, a pilot lamp 13 for indicating the switched-on state of the iron and a pilot lamp 14 for indicating the actual flow of current through the heater, is arranged within arm's reach or respectively within visual range of the operator. On the top of the housing 7 a plug connector 11 is provided for interchangeable connection of the iron via the cable 15. An interface which enables the interchangeability of irons and regulating devices is thereby produced between the temperature sensor TF, for example, having a temperature-dependent resistor 2, on the side next the iron on the one hand, and the electrical circuit of the regulating device 6 with its setting and alignment elements on the other hand. For the purpose of accessibility and substitution of the temperature sensor the top part of the iron with the handle 18 and covering hood 17 is connected to the sole 1 pivotally about a hinge 23. For the rest there is on top of the covering hood an insulating layer 19 consisting, for example, of felt to insulate against heat radiation, as protection for the hand of the operator.

Figure 3:
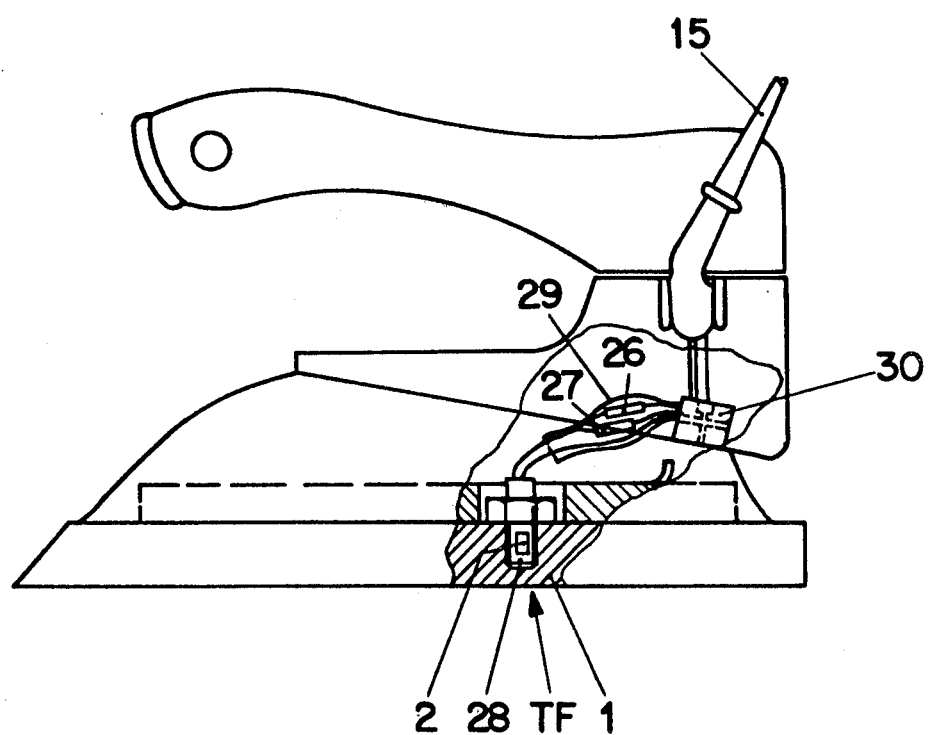
FIG. 3 shows a steam iron, in particular for use in an ironing device in accordance with FIGS. 1 and 2, in a partially sectioned side elevation.

FIG. 3 shows the arrangement of the temperature sensor TF which is made as a sensor screw 28 inserted from above into the sole 1, and as the active element the temperature-dependent resistor 2, preferably a NTC-resistor which in the example is interconnected with a series compensating resistor 26 and a parallel compensating resistor 27. These resistors are combined into one unit in the course of the temperature sensor leads by an insulating tube 29 and are connected to a terminal block 30 which facilitates the interchange of sensors together with resistor circuit, and which produces the connection via the flexible cable to the regulating device.

Figure 4:
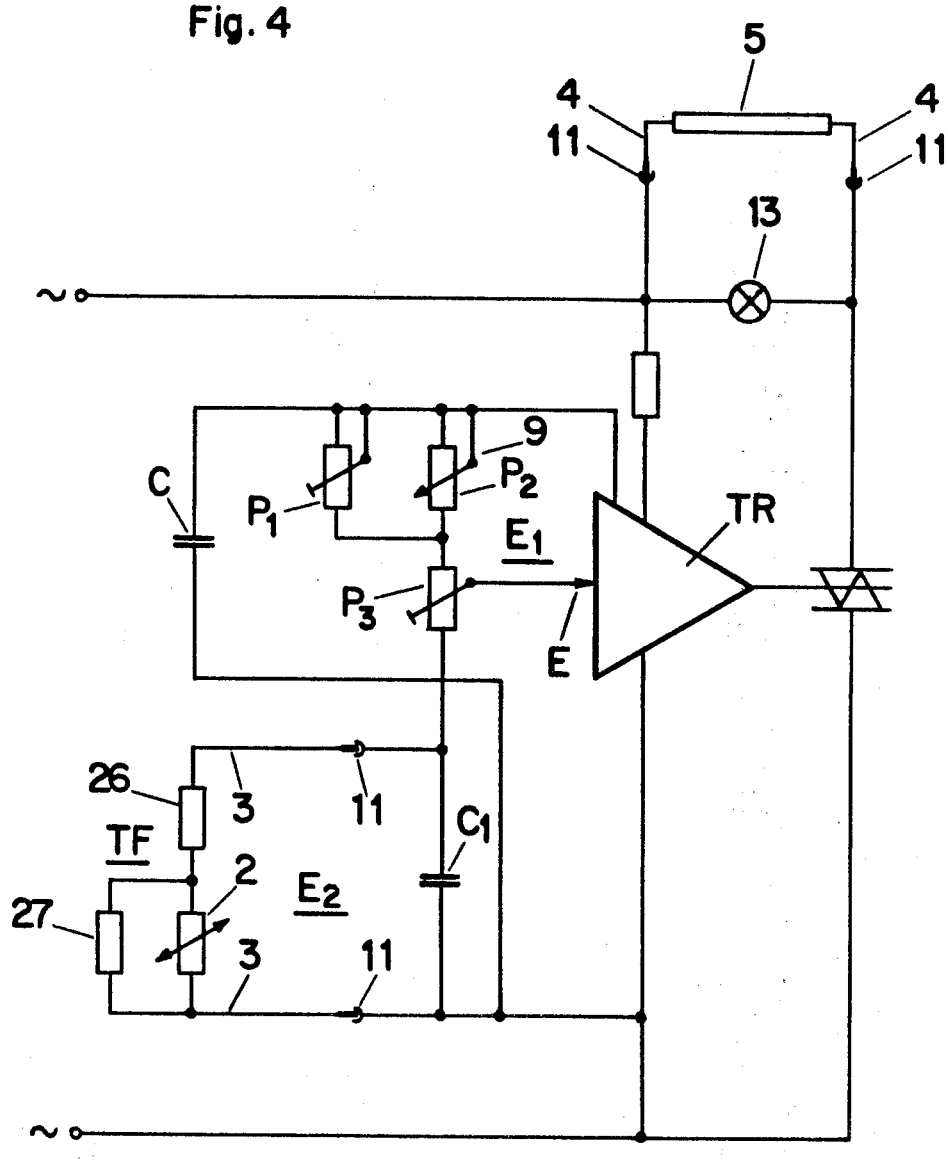
FIG. 4 is a basic circuit diagram of a temperature regulating device with a temperature sensor for an ironing device of the aforesaid kind.

The circuit of the regulating device 6 in combination with the temperature sensor TF follows from FIG. 4. The temperature sensor with its compensating resistors 26 and 27 is consequently connected via the leads 3 in the flexible cable 15 and corresponding contacts in the plug connection 11 to the temperature regulator TR in the regulating device 6. The latter exhibits an input circuit with a first input subcircuit $E_1$ and a second input subcircuit $E_2$. The first input subcircuit comprises a setting resistor $P_2$ for the desired value of temperature and is provided with a parallel-connected first adjusting resistor $P_1$ as well as with a series-connected second adjusting resistor $P_3$. The second adjusting resistor is made as a potentiometer, the tapping from which is connected to a corresponding input E of the regulator. For the latter commercial components known in themselves, in particular, integrated circuits having all of the necessary regulating functions come into consideration. The two input subcircuits which likewise in the way which may be seen directly from FIG. 4 are connected by corresponding connections to the regulator TR form together with corresponding branch circuits (not shown) inside this regulator a bridge circuit, the input E leading to a zero voltage detector arranged on the diagonal of the bridge inside the regulator. The output A of the regulator controls directly a power switch LS in the heating current circuit closed by the heater 5 with the pilot lamp 13 in parallel, this circuit being fed in the example from the a.c. supply network. As the power switch an a.c. semiconductor switch is provided, for example, a triac. The d.c. supply to the regulator and the bridge circuit with the input subcircuits $E_1$ and $E_2$ is in the example drawn from the a.c. network through a rectifier (not shown) in the regulator and smoothed by means of a capacitor C.

The second input subcircuit $E_2$ is formed essentially by the temperature sensor TF with its compensating resistors and the NTC-resistor 2. The series compensating resistor 26 in that case serves for the adjustment of a reference temperature lying in the lower range of variation of the overall value of resistance of the sensor, the parallel compensating resistor 27 correspondingly on the other hand for the adjustment of a reference temperature lying in the upper range of variation of this overall value of resistance. In the case of the employment of a NTC-resistor as the active element in the sensor this means the adjustment of an upper reference temperature by the series compensating resistor and a lower reference temperature by the parallel compensating resistor. In this way two points on the characteristic of the temperature sensor can be aligned and hence a good approximation of the compensated course of the characteristic to a predetermined calibration curve can be achieved.

If necessary only one compensating resistor may be employed for the alignment of a single point on the characteristic. The adjusting resistors $P_1$ and $P_3$ in the first input subcircuit $E_1$ correspond in their arrangement and action with the aforesaid compensating resistors, whilst the setting resistor $P_2$ acts as the desired value setting member with actuator element 9 (knob) and in the case of a predetermined resistance-angle of rotation characteristic in combination with the previously mentioned alignment enables the employment of a fixed predetermined scale division for the desired value temperatures. The adjusting resistors furthermore enable equalization of manufacturing tolerances in the electronic components and circuits.

In practice the alignment of the regulating device is effected in such a way that the input subcircuit $E_1$ with its elements, for two predetermined reference temperatures or respectively settings of the resistor $P_2$ is aligned by means of the adjusting resistors on predetermined overall resistance values which in the case of corresponding overall resistance values of the input subcircuit $E_2$ yield with the temperature sensor a bridge alignment whereby the manufacturing tolerances of the circuit elements are equalized. On the other hand the temperature sensor with its compensating resistors is at the two reference temperatures aligned on the associated overall resistance values in harmony with the aforesaid alignment of the first input subcircuit. Scatterings of the characteristics of the temperature-dependent resistors, in particular the NTC-resistors are thereby largely equalized. The desired interchangeability now follows from the fact that with respect to the interface formed by the plug connector 11 the temperature sensor with its compensating resistors is arranged on the side next the iron and the input subcircuit $E_1$ of the regulator with the setting resistor and the adjusting resistors is arranged on the side next the regulating device. One of the two reference temperatures may preferably be chosen as a limiting temperature of the working range.

Furthermore in the second input subcircuit $E_2$, arranged in parallel with the temperature-dependent resistor 2 or if necessary also in parallel with a series circuit of the latter and at least one compensating resistor or also additional drop-resistors, there is a delay-capacitor $C_1$ which advantageously is accommodated on the regulator side of the plug connector 11. This capacitor acts as a delay member and during the heating-up process after the switching on of the ironing device looks after a certain and rapid heating-up even in the case of an initial overstepping of the range of control of the regulator in the cold state of the temperature sensor. Such control limits and the overstepping of them are in the case of usual temperature regulators often made use of for additional supervisory functions, in particular for supervision of an interruption in the temperature sensor and its leads.

Figure 5:
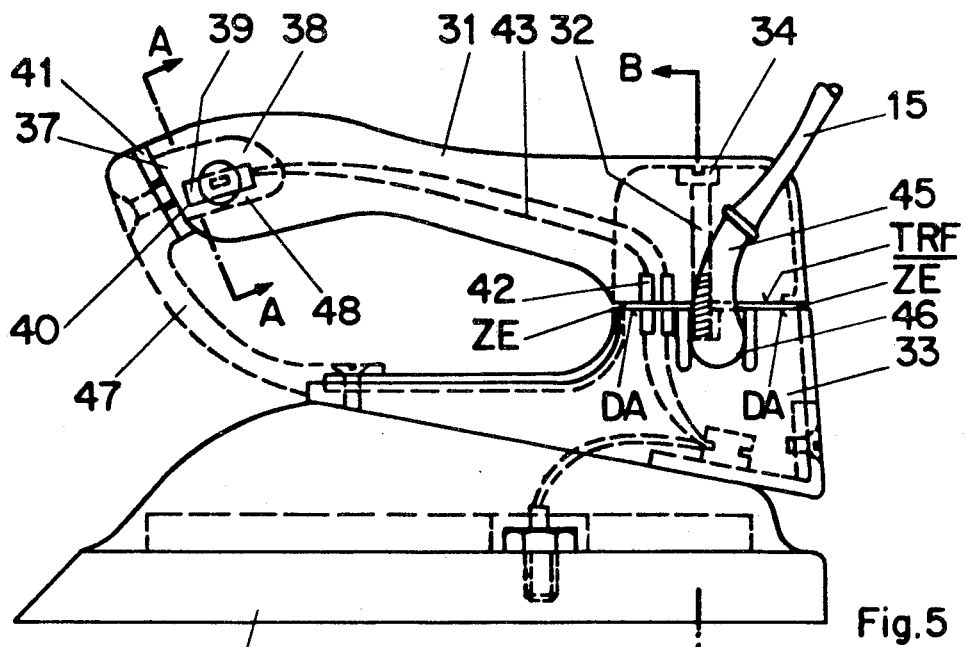
FIG. 5 is a diagrammatic side elevation of the iron shown in FIG. 1 with its internal construction shown dotted.

FIG. 5 shows the construction of an embodiment provided as a steam iron, having the actuator device for the control of the steam feed via the control valve 25 of the steam generator, indicated in FIG. 1. For this purpose a control switch 39 is arranged in the front end region of the handle 31 of the iron and is connected electrically via a control lead 43 as well as the terminal block 30 already mentioned in relation to FIG. 3, to corresponding cores of the common connecting cable 15 and beyond that to a control input to the valve 25. As follows in particular from FIG. 6, an actuator member 38 made as a yielding section of wall of the handle 31 is associated with the control switch 39, and lies directly within the range of action of the thumb of the hand holding the handle. The control switch with its sensitive contacts can thereby be accommodated in a closed cavity 37 in the handle and protected against aggressive influences, whilst simultaneously easy and convenient handling is ensured. Advantageously the yielding section of wall may be provided with a reinforcement-part 48 standing out on the inside and/or outside, whereby reliable transmission of force to the contact drive of the control switch or respectively a particularly secure handling is achieved. The convenient handling without impairment of the secure guidance of the iron is served above all by the arrangement of the direction of motion BR of the control switch actuator member. This direction is arranged at the angle, that is, in the example advantageously about at right angles, to the longitudinal axis of the handle corresponding with the natural mobility of the thumb, as well as furthermore with an acute angled inclination to the horizontal, that is, from the actuating side towards the opposite side of the handle inclined downwards in the direction towards the face of the sole of the iron. In view of the preponderant operation by right-handed persons the actuator member 38 of the control switch is arranged in the region of the front part of the handle on the left-hand side of the handle looking in the direction longitudinal to the handle from the rear towards the front end of the handle. Preferably a microswitch having an actuating stroke of less than about 2 mm is provided for the control switch, which further facilitates handling.

Figure 6:
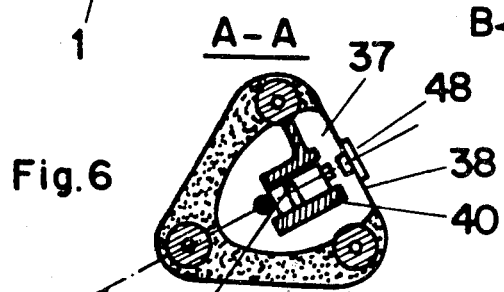
FIG. 6 is a partial cross-section of the handle of the iron along the line A—A of FIG. 5.

From FIGS. 5 and 6 can be seen the cavity 37 open towards the front end of the handle, inside which the control switch 39 is fastened detachably by a carrier 40, for example, by a simple catch or plug connection. The supply leads 43 to the control switch are led through a cavity (not indicated in greater detail) extending in the longitudinal direction of the handle and provided in the region of a joint face TRF between the handle 31 and a handle-carrier 33 with an additional plug connector 42. This construction facilitates not only the interchange of the whole handle which in view of wear and for hygienic reasons in the case of the use of an iron by different persons is advantageous, but also the exchange of the control switch as a wearing part together with the adjoining section of lead. The cavity 37 may advantageously be closed in a simple way by a screwed cover plate 41 which advantageously at the same time ensures the security of the control switch in the catch or plug connection of its carrier. Further, if necessary a support 47 may be screwed onto the front end of the handle, which produces an additional supporting connection to the front end of the handle carrier 3.

Figure 7:
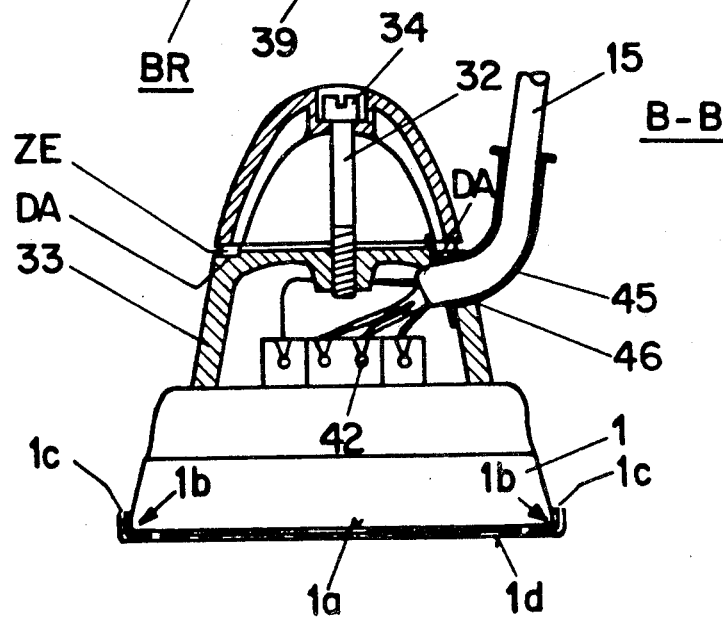
FIG. 7 is a cross section of the iron shown in FIG. 5 along the line B—B.

The construction of the iron which may be seen in particular from FIG. 7 is further advantageous for assembly and for works of interchange, in the way that the handle 31 is fitted to the handle carrier 33 merely by fastener elements accessible from the outside, that is, preferably by means of only one tiebolt 32 which is screwed by its threaded section into a tapped hole in the top of the handle carrier in the region of the joint face TRF and bears by its head 34 in a depression in the top of the rear section of handle. Hence the bolt acts as a tie-fastener element which passes at right angles through the joint face TRF. Inside the joint face on the underside of the handle and on the top of the handle carrier points of pressure contact DA are provided, which cover inside the joint face an angle of more than 200°, preferably of at least approximately 360°, with respect to the point of penetration of the tiebolt into the joint face. Thereby results at least a three-point bearing of the rear part of the handle against the handle carrier with the tightening by the tiebolt 32, i.e., a rigid, robust and easily detachable fastening of the handle. For securing the handle against sideways shifting and twisting about the tiebolt, centreing elements ZE are further arranged inside the joint face, acting all round between the handle and the handle carrier.

In FIG. 7 is indicated again the fundamental construction of the layered structure of the face of the sole of the iron, already mentioned in the introduction with its build-up and its preferred composition. On the underside of the sole 1 is provided a layer 1a having a microporous structure which may be applied by thermal spraying (flame spraying, plasma spraying or the like). The edges 1b of the sole are clad with a layer 1c of hard aluminium oxide (hard "Eloxal"). The whole surface region inclusive of the edges of the sole is coated with a surface layer 1b of polytetrafluroethylene.

In the region of the joint face TRF, again in the way which may be seen from FIG. 7, a spout 46 surrounding the end of the cable 15 at the iron end is let into a recess in the handle carrier 33 and by an inner bead 46a engages behind the wall of the handle carrier. Hence after bolting on the handle there results a simple and secure fastening of the cable end with relief from pulling.

We claim:

1. An ironing device comprising an iron having an electrically heated and temperature regulated sole, at least one temperature sensor positioned in the vicinity of said sole, and a heater connected to an external supply of electrical current, temperature regulating means positioned remote from said iron for controlling the current supply to said heater and responsive to said temperature sensor, said temperature sensor having at least one temperature-dependent resistor, at least one compensating resistor connected with said temperature-dependent resistor, an actual-value input means for setting the desired temperature of said sole, said input means having a component whose resistance is variable to select the desired sole temperature, said temperature-dependent resistor further being connected to said actual-value input means, the overall value of resistance formed by said temperature-dependent resistor and said compensating resistor at a predetermined sole temperature being selected to correspond with the overall resistance of said actual-value input means when the resistance of said variable resistance component has been selected to correspond to said predetermined temperature.

2. An ironing device according to claim 1 in which said compensating resistor is connected in series with said temperature-dependent resistor and the resistance of said compensating resistor is selected so that the total series resistance of said temperature-dependent resistor and said compensating resistor corresponds to the resistance of said actual-value input means when said actual-value input means is adjusted to select a desired temperature in a lower portion of the overall range of resistance variation of said temperature-dependent resistor.

3. An ironing device according to claim 1 in which the resistance of said compensating resistor is selected to correspond with the resistance of said actual value input means at an upper operational temperature limit of said ironing device.

4. An ironing device according to claim 3 in said compensating resistor is connected in parallel with said temperature-dependent resistor and the resistance of said compensating resistor is selected so that the total parallel resistance of said temperature-dependent resistor and said compensating resistor corresponds to the resistance of said actual-value input means when said actual-value input means is adjusted to select a desired temperature in an upper portion of the overall range of resistance variation of said temperature-dependent resistor.

5. An ironing device according to claim 1 in which said temperature regulating means includes a temperature regulator which has an input circuit having a first input sub-circuit and a second input sub-circuit, said first input sub-circuit having an adjustable setting-resistor for setting the desired temperature of said sole, a first adjusting-resistor connected in parallel with said setting-resistor and a second adjusting-resistor connected in series with the setting-resistor, the second input sub-circuit including therein the temperature-dependent resistor of the temperature sensor.

6. An ironing device according to claim 5, in which the second input sub-circuit has a delay-capacitor in parallel with said temperature-dependent resistor of said temperature sensor.

7. An ironing device according to claim 5 or claim 6, in which said temperature sensor is connected to said temperature regulating means by a lead having at least one plug-in connector, at least one compensating resistor being positioned on the side of the connector adjacent the iron and at least one adjusting-resistor being positioned on the side of the plug-in connector adjacent said temperature regulating means.

8. An ironing device comprising an iron having an electrically heated and temperature regulated and generally planar sole, at least one temperature sensor positioned in the vicinity of said sole, a heater connected to an external source of electrical current, a steam feed, and a manually actuatable switch for the control of said steam feed, said control switch forming a part of a control circuit of a solenoid valve arranged in the steam feed, and a handle extending generally parallel to the face of said sole, said control switch having an actuator mounted on the handle, the axis of motion of the actuator intersecting the handle substantially at right angles to the longitudinal axis of the handle.

9. An ironing device according to claims 1 or 8, in which the iron has a handle connected at least at its rear end to a handle-carrier and via the handle carrier to said sole, the handle being fastened to the handle-carrier by at least one fastener element accessible externally of the handle.

10. An ironing device according to claim 9, in which the handle is fastened to the handle-carrier by a tiebolt which passes through a joint face between the handle and the handle-carrier substantially at right angles thereto, the joint face being provided with points of pressure contact between the handle and the handle-carrier, which points cover an angle of more than 200° around the tiebolt.

11. An ironing device according to claim 10, in which centering elements are provided all round the joint face between the handle and the handle-carrier.

12. An ironing device according to claim 1 or 8, in which the iron comprises an electrically heated sole having a layer having a microporous structure, a layer of hard aluminum oxide being provided embracing the edges of the sole, and the face of the sole being formed by a surface layer of a slide-promoting plastic, likewise embracing the edges of the sole.

13. An ironing device according to claim 12, in which the microporous layer consists at least partially of molybdenum.

14. An ironing device according to claim 1 or 8, having a handle arranged above a heated sole, and in which in the region between the underside of the handle and the sole an insulating layer is provided to inhibit the radiation of heat and heat-conductive contact with the hand of an operator.

15. An ironing device according to claim 8, in which said actuator is mounted on the front part of the handle on the left-hand side of the handle when looking along the handle from the rear end.

16. An ironing device according to claim 8 or claim 15, in which the direction of motion of the actuator is inclined to the plane of said sole at an acute angle extending from the actuation side towards the opposite side of the handle downward in the direction toward said sole.

17. An ironing device according to claim 8, in which said control switch is positioned inside said handle, the switch-actuator comprising a yielding section of wall of said handle.

18. An ironing device according to claim 17, in which the section of wall of said handle forming the switch-actuator member is provided with a reinforcement part standing out from the wall.

19. An ironing device according to claim 18, in which said control switch comprises a microswitch having an actuating stroke of less than 2 mm.

20. An ironing device according to claim 8, in which said control switch is mounted on a carrier which is detachably mounted in a cavity in said handle.

21. An ironing device according to claim 8, further including electrical supply leads to said control switch, said leads passing through a cavity in said handle and further including a plug-in connector connected to said supply leads.

22. An ironing device according to claim 21, in which said plug-in connector is arranged at a joint face between the handle and a handle-carrier lying below it.

23. An ironing system for industrial use, the system comprising a plurality of irons and a plurality of temperature regulating devices, each of said irons having an electrically heated and temperature-regulated sole, at least one temperature sensor positioned on or adjacent to said sole and a plug-in connector for connecting the temperature sensor and the heater of each of said irons to one of said temperature regulating devices and to an external source of electrical current for heating respectively, at least one adjusting-resistor being connected in the circuitry of each of said temperature regulating devices on the side of said plug-in connector adjacent said temperature regulating device, the resistance value of said adjusting-resistor being chosen so as to render the input impedance of the circuitry on the side of said plug-in connector adjacent said temperature regulating device at least substantially equal to a value which has been predetermined in common for the plurality of temperature regulating devices of said ironing system.

24. An ironing system according to claim 23 wherein at least one compensating resistor is connected in the circuitry of each of said temperature sensors on the side of the connector adjacent the iron, the resistance value of each of said compensating resistors of said plurality of irons being chosen so as to render the input impedance of the circuitry of said temperature sensor on the iron side of said plug-in connector at least substantially equal to a predetermined common value for said plurality of irons of the system.

* * * * *

UNITED STATES PATENT AND TRADEMARK OFFICE
CERTIFICATE OF CORRECTION

PATENT NO. : 4,322,900

DATED : April 6, 1982

INVENTOR(S) : Hacker, et al.

It is certified that error appears in the above-identified patent and that said Letters Patent are hereby corrected as shown below:

Item [30] on title page should read:

[30]   Foreign Application Priority Data

Jan. 11, 1978 [DE]  Fed. Rep. of Germany ......2801012
    May  26, 1978 [DE]  Fed. Rep. of Germany ......2822930
    May  26, 1978 [DE]  Fed. Rep. of Germany ......2822929

Signed and Sealed this

Twentieth Day of July 1982

[SEAL]

Attest:

GERALD J. MOSSINGHOFF

Attesting Officer

Commissioner of Patents and Trademarks